US008499871B2

(12) United States Patent
Renard et al.

(10) Patent No.: US 8,499,871 B2
(45) Date of Patent: Aug. 6, 2013

(54) WORK VEHICLE HOOD ACTUATOR

(75) Inventors: Mark Allan Renard, Page, ND (US); Eric G. Olson, Fargo, ND (US); Logan C. Miller, Clifford, ND (US)

(73) Assignee: CNH America, LLC, New Holland, PA (US)

( * ) Notice: Subject to any disclaimer, the term of this patent is extended or adjusted under 35 U.S.C. 154(b) by 188 days.

(21) Appl. No.: 13/050,420

(22) Filed: Mar. 17, 2011

(65) Prior Publication Data

US 2012/0235446 A1 Sep. 20, 2012

(51) Int. Cl.
*B62D 25/10* (2006.01)

(52) U.S. Cl.
USPC .................................... 180/69.2; 296/193.11

(58) Field of Classification Search
USPC ........... 180/69.2–69.24, 89.12, 89.14, 89.15; 296/193.11
See application file for complete search history.

(56) References Cited

U.S. PATENT DOCUMENTS

| | | | | |
|---|---|---|---|---|
| 2,135,613 | A | 11/1938 | De Orlow | |
| 4,991,675 | A | 2/1991 | Tosconi et al. | |
| 5,730,239 | A | 3/1998 | Holter | |
| 6,213,235 | B1 * | 4/2001 | Elhardt et al. | 180/69.2 |
| 6,991,055 | B2 | 1/2006 | White et al. | |
| 7,293,624 | B2 | 11/2007 | Adachi | |
| 8,011,645 | B2 * | 9/2011 | McConnell et al. | 267/291 |
| 2004/0262828 | A1 | 12/2004 | Bauman | |
| 2006/0086551 | A1 * | 4/2006 | Cleland et al. | 180/69.2 |
| 2009/0229901 | A1 | 9/2009 | Aoki et al. | |
| 2009/0236876 | A1 | 9/2009 | Sawai et al. | |
| 2009/0289474 | A1 | 11/2009 | Kim et al. | |
| 2009/0302644 | A1 | 12/2009 | Mori et al. | |

FOREIGN PATENT DOCUMENTS

| | | | |
|---|---|---|---|
| JP | 358004673 | A | 1/1983 |

* cited by examiner

*Primary Examiner* — John Walters
*Assistant Examiner* — James Triggs
(74) *Attorney, Agent, or Firm* — Patrick M. Sheldrake

(57) ABSTRACT

A position control system including an actuator having a first end, an axis and including a driving device for moving the first end of the actuator in opposed directions, the first end of the actuator configured to move a hood between an open position and a closed position. A surface is associated with the hood that is configured to interact with the first end of the actuator in response to the first end of the actuator contacting and moving the hood between the open position and the closed position. The first end of the actuator moves along the axis and remains substantially coincident with the first axis while the first end moves the hood between the open position and the closed position.

16 Claims, 9 Drawing Sheets

WORK VEHICLE HOOD ACTUATOR

FIELD OF THE INVENTION

The present invention relates generally to the field of cover or hood position control systems. It relates more particularly to cover or hood position control systems for use with work vehicles.

BACKGROUND OF THE INVENTION

Work vehicles, such as wheel loaders, include an implement with which to perform work during operation of the work vehicle. The implement is typically located at one end of the work vehicle. Large covers or hoods are typically used to enclose the motor of the work vehicle, and are positioned at the opposite end of the work vehicle.

For reasons including the size and/or weight of the covers or hoods, actuators may be used instead of requiring manual raising/lowering of the covers or hoods. Conventional actuator constructions have opposed, fixed pinned connections securing the ends of the actuator between work vehicle structure and the cover or hood. By virtue of the fixed pinned connection, as used with a conventional hinged cover or hood, the angle of the actuator changes, depending upon the position of the hood. This change in actuator angle is due to the end of the actuator associated with the hood following the fixed pinned connection with the cover or hood, which pinned cover or hood connection sweeping an arc between an open and a closed position.

Unfortunately, space requirements under the hood are becoming increasingly critical, due to performance requirements, such as motors having increased power and specific airflow requirements, as well as other requirements. Such space associated with the angular movement of conventional actuators during operation represent “wasted space”.

Accordingly, it would be advantageous to provide a hood or cover position control system that operates substantially without changes in the angle of the actuator throughout the range of operation of the hood or cover between open and closed positions.

SUMMARY OF THE INVENTION

The present invention further relates to a position control system including an actuator having a first end, an axis and including a driving device for moving the first end of the actuator in opposed directions, the first end of the actuator configured to move a hood between an open position and a closed position. A surface is associated with the hood that is configured to interact with the first end of the actuator in response to the first end of the actuator contacting and moving the hood between the open position and the closed position. The first end of the actuator moves along the axis and remains substantially coincident with the first axis while the first end moves the hood between the open position and the closed position.

The present invention further relates to a work vehicle including a work vehicle including a motor associated with selectable movement of a frame by operator controls and includes the frame structurally carrying a cab structure. A hood position control system is secured to the frame of the work vehicle including an actuator having a first end, an axis and including a driving device for moving the first end of the actuator in opposed directions, the first end of the actuator configured to move a hood between an open position and a closed position. A surface is associated with the hood that is configured to interact with the first end of the actuator in response to the first end of the actuator contacting and moving the hood between the open position and the closed position. The first end of the actuator moves along the axis and remains substantially coincident with the first axis while the first end moves the hood between the open position and the closed position.

An advantage of the present invention is a hood control system that operates substantially without changing its angular orientation, irrespective the position of the hood.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
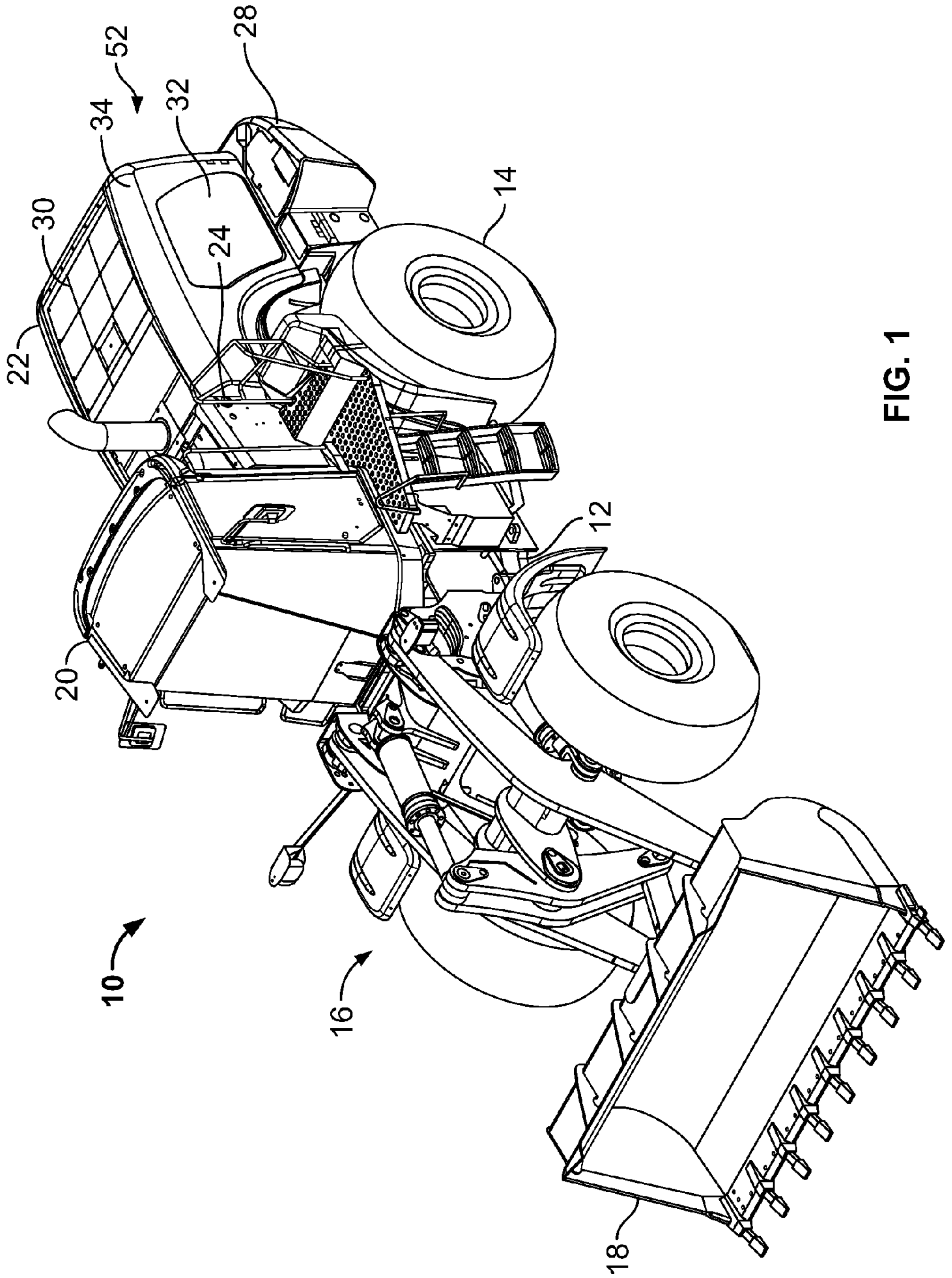
FIGS. 1 and 2 are top perspective views of an embodiment of a work vehicle showing a hood in respective closed and open positions.
Figure 2:
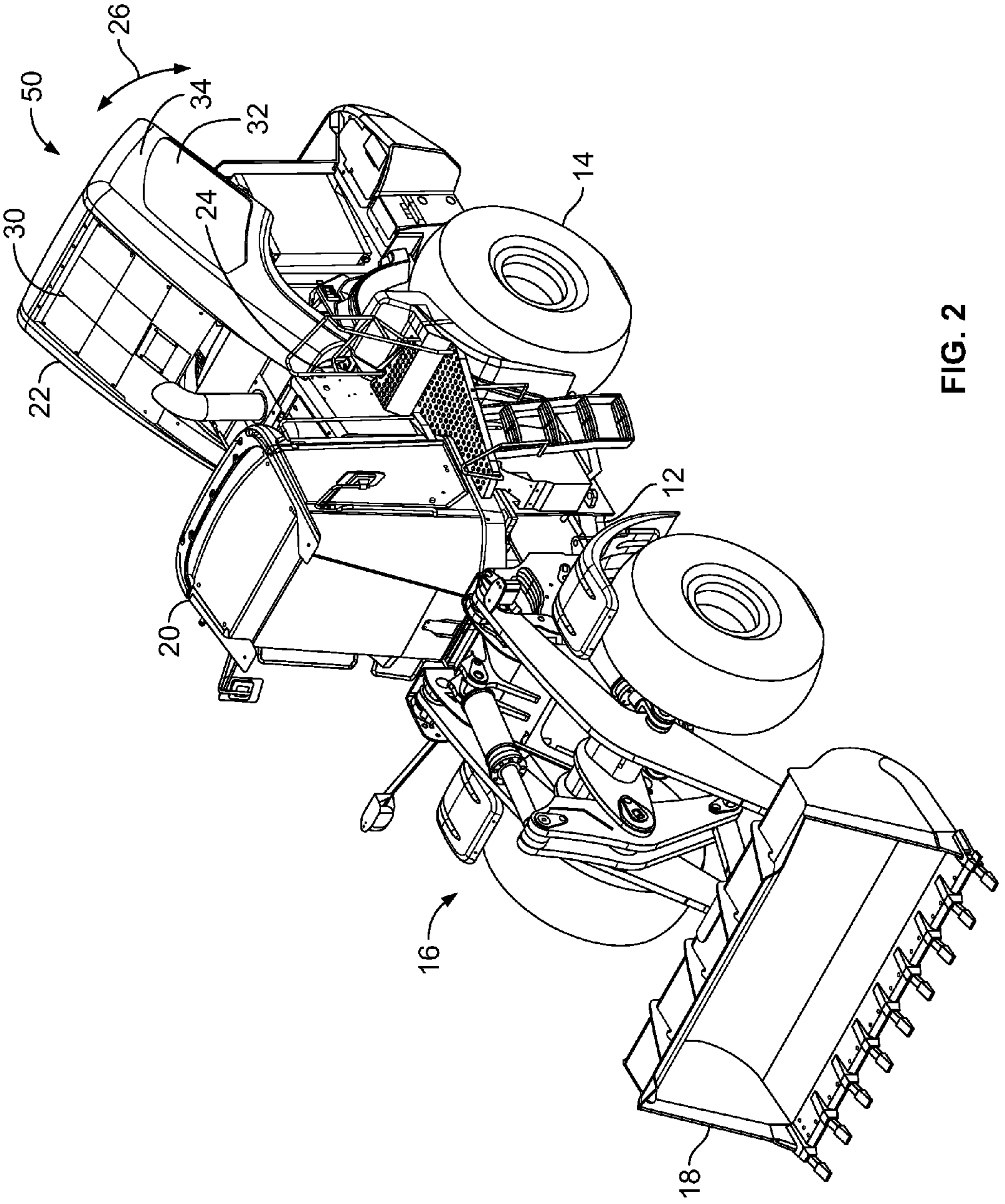

FIG. 1 shows a work vehicle 10 provided with a frame 12 that rotatably carries a plurality of wheels 14. Alternately, a track drive or other appropriate drive system to movably drive the frame may be used. A manipulating structure 16 includes an arrangement of structural members and actuators controllable by an operator (not shown) located within a cab structure 20 to manipulate an implement 18 to perform work. Frame 12 structurally supports cab structure 20 to surround and protect the operator. Located opposite implement 18 is a motor (not shown) that is surrounded by a housing or hood 22 that surrounds the motor when the hood is in a retracted position. Due to the enlarged hood’s size and weight, in one embodiment, a hood opening device (not shown) may be operated by an electric motor. However, in other embodiments, springs or other types of devices, such as hydraulic, mechanical, pneumatic or combination may be used. In combination with a pair of opposed pivots 24 and the hood opening device, hood 22 is urged into a rotational movement 26. As further shown in FIG. 1, hood 22 is in a retracted position, resting on frame 12 which extends to a member such as a counterweight 28. FIG. 2 shows hood 22 in an open position.

FIG. 2 further shows hood 22 including a metal substructure or metal frame 30. Metal frame 30 provides structural strength and stability to the hood to structurally support side panels 34.

Figure 3:
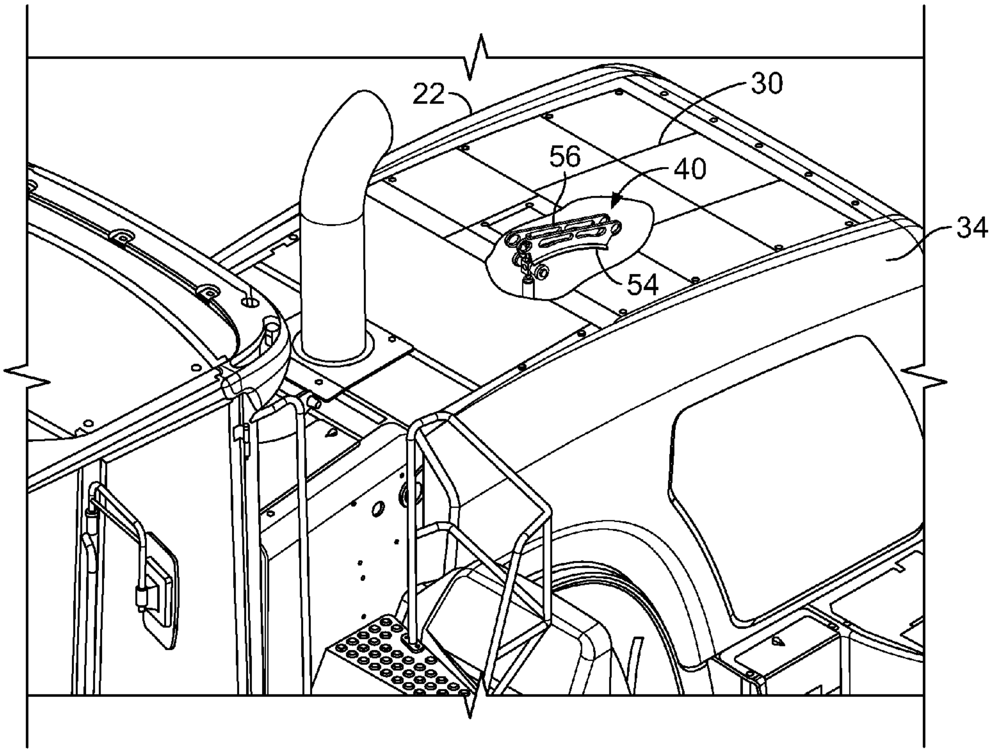
FIG. 3 is an enlarged, partial cutaway view of the hood in a closed position, showing an exemplary embodiment of a hood position control.
Figure 4:
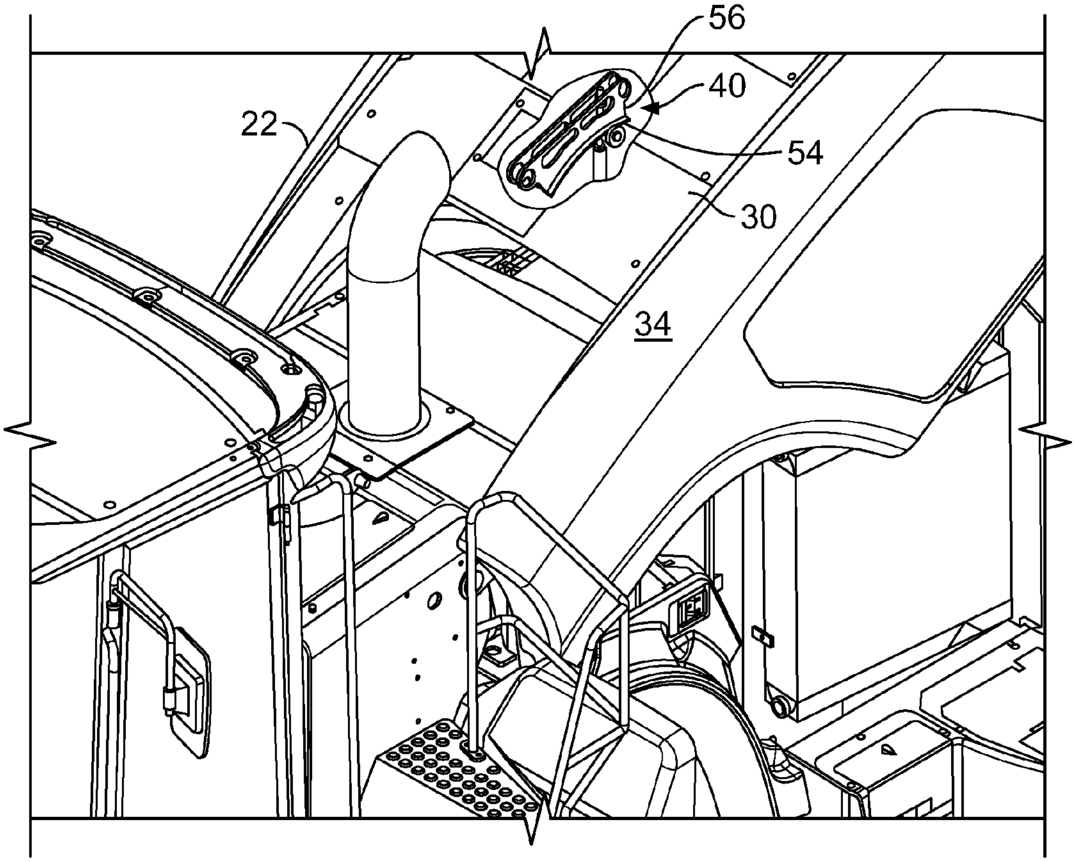
FIG. 4 is an enlarged, partial cutaway view of the hood in an open position, showing the hood position control.
Figure 5:
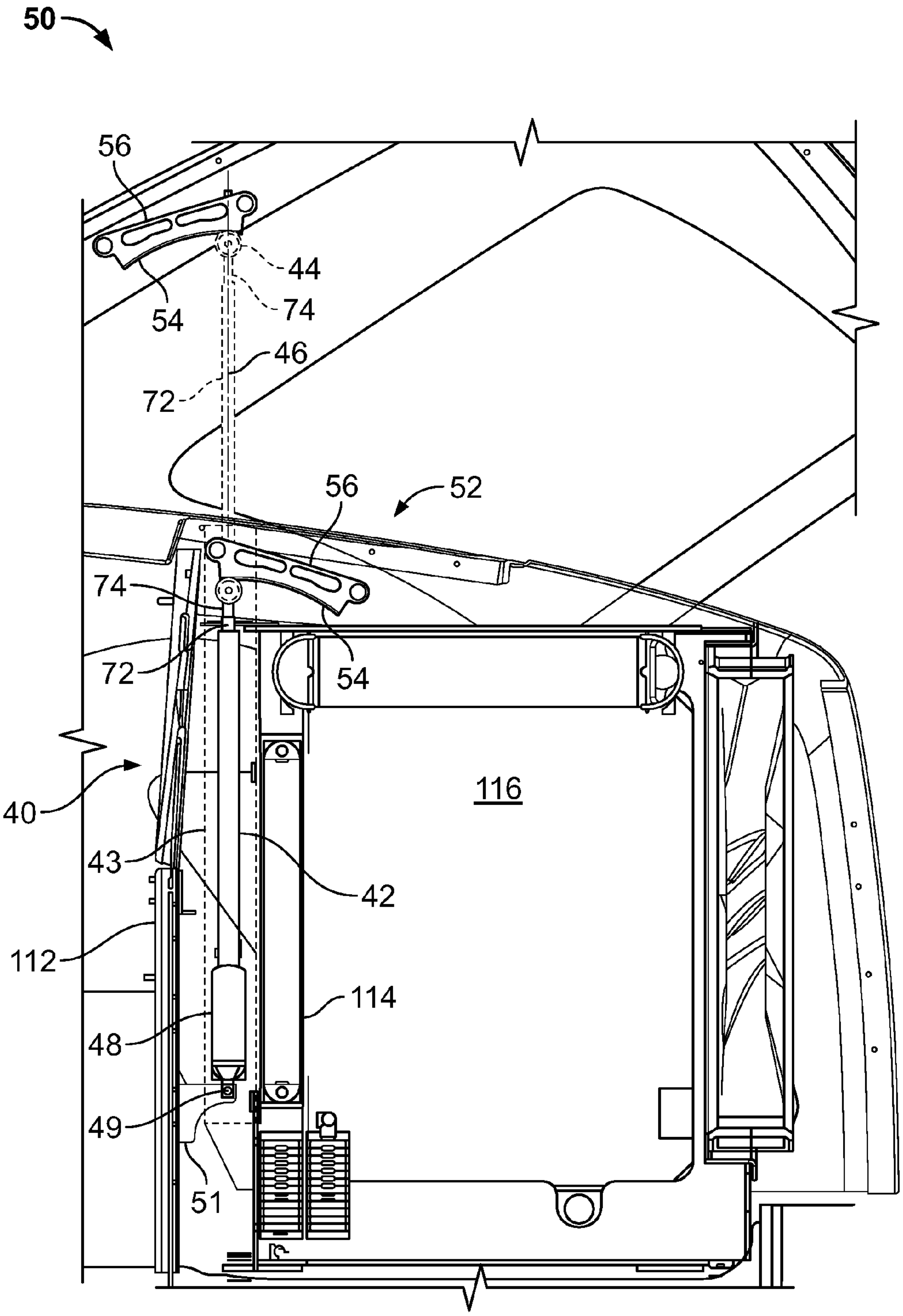
FIG. 5 is an elevation view of the hood position control in respective closed and open positions.

FIGS. 3-5 show a position control system 40 to raise and lower hood 22. Position control system 40 includes a driving device 48 that is drivingly connected to an actuator 42 at one end and is secured by a pin connection 49 to frame structure 51 at the other end of the driving device. In one embodiment, actuator 42 may be manufactured by Linak® of Louisville, Ky. Actuator 42 includes a rod 72 further including a rod adapter, such as a rod eye male adapter 74 having a first end 44 which interacts with a surface 54 associated with hood 22 while the hood is being raised or lowered. It is to be understood that other types and styles of rod adapters may also be used. As further shown in FIGS. 3-5, a track 56 includes surface 54. Rod adapter 74 and first end 44 are urged into non-rotating movement along an axis 46 by driving device 48. During operation of position control system 40, rod 72, rod adapter 74 and first end 44 are maintained substantially coincident with axis 46. That is, while rod 72, rod adapter 74 and first end 44 are urged into movement to selectably raise or lower hood 22, the rod, rod adapter and first end are substantially maintained in alignment with axis 46, irrespective of the position of hood 22. As a result of actuator 42 of position control system 40 operating substantially coincident with axis 46, the position control system may operate within a confined volume 43, which confined volume 43 represents a significantly reduced operating volume when compared to conventional actuator arrangements, permitting room under the hood for other uses. As further shown in FIG. 5, such confined volume 43 is centrally positioned about the centerline of the work vehicle and extending substantially vertically in the engine compartment 116, such as between structure defining or surrounding the engine compartment, such as a firewall 112 and cooling component 114 for cooling the fluid.

Figure 6:
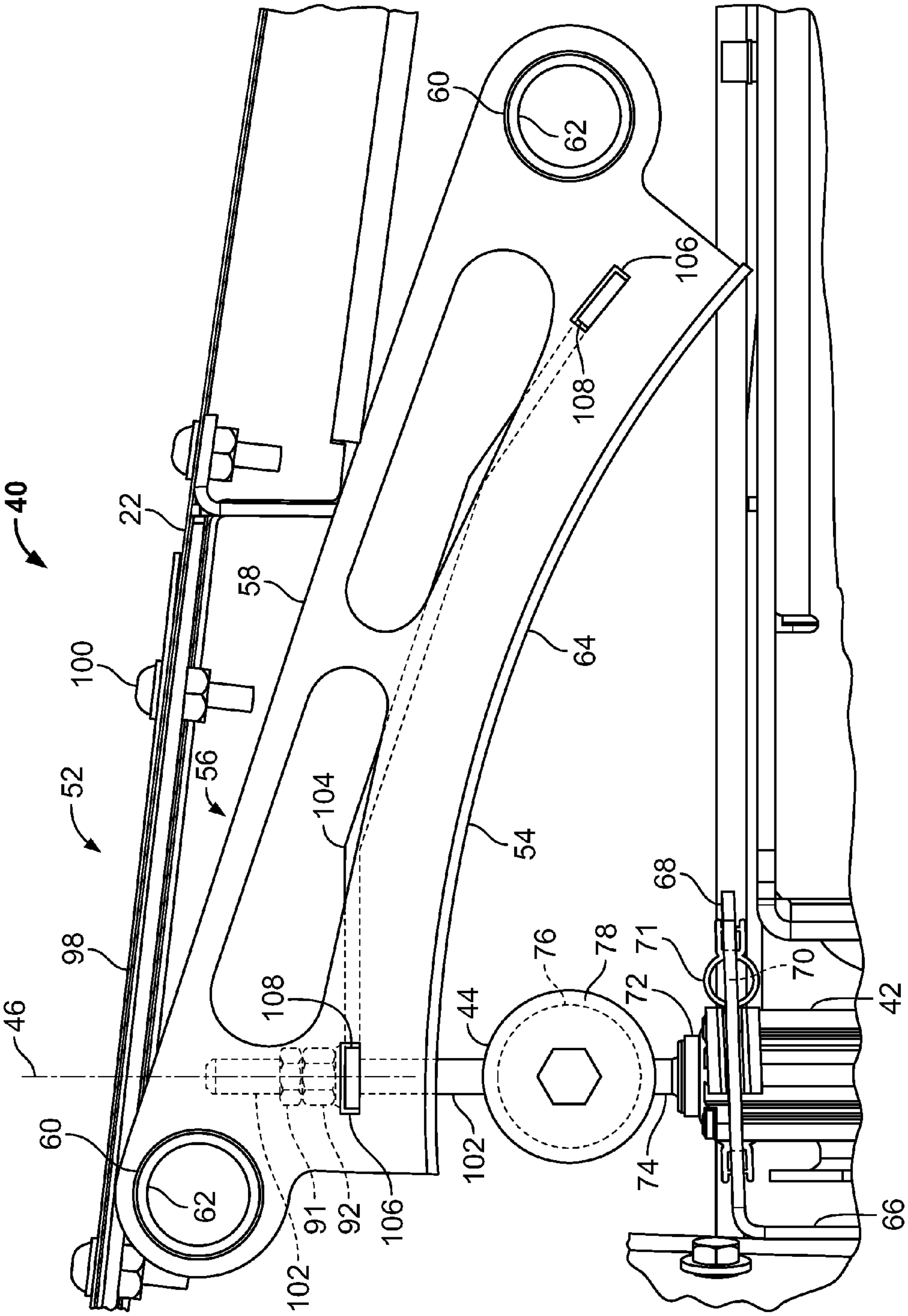
FIG. 6 is an enlarged, partial elevation of the hood position control in a closed position.
Figure 7:
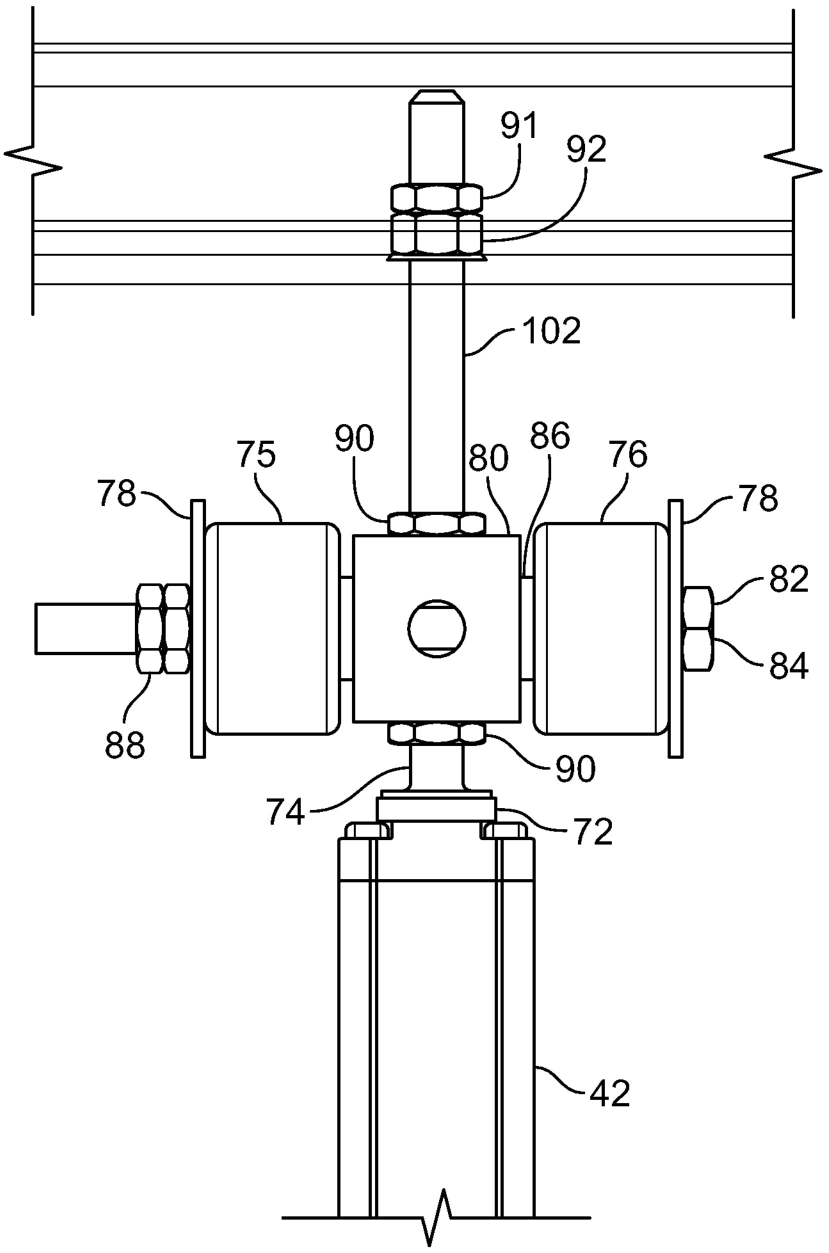
FIG. 7 is an end view of the hood position control, with a roller assembly removed for clarity.
Figure 8:
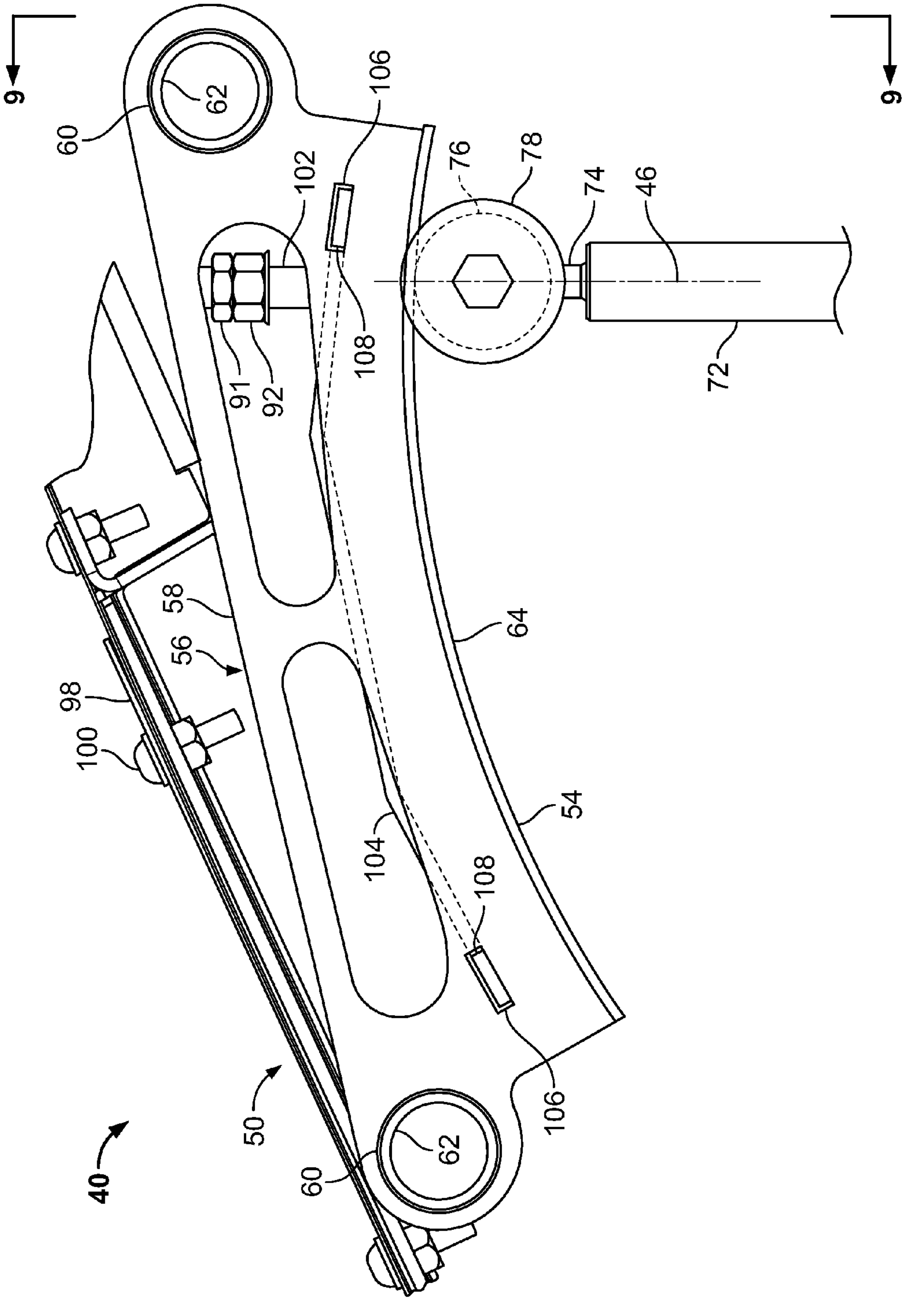
FIG. 8 is an enlarged, partial elevation of the hood position control in an open position.

FIGS. 6-9 show position control system 40 with hood 22 in a closed position 52 (FIG. 6) and in an open position 50 (FIG. 8). As further shown FIG. 6, actuator 42 is substantially maintained in alignment with axis 46 via a fixed structure, such as a bracket 66 that extends to a flange 68 having an opening 70 through which the actuator extends. A non-abrasive retention material 71, such as a bulb seal, is secured along at least a portion of opening 70, and in another embodiment, the bulb seal is secured along the entire opening 70. However, in another embodiment, other retention arrangements may be used, such as a clamp or structure extending from the actuator (not shown) that may be directly secured to the frame of the work vehicle. As shown, confined volume 43 is centrally positioned about the centerline of the work vehicle and extending substantially vertically in engine compartment 116, such as between structure defining or surrounding the engine compartment, such as a firewall 112 and cooling component 114 such as for cooling a fluid. However, in other embodiments confined volume 43 may be located in other positions.

Figure 9:
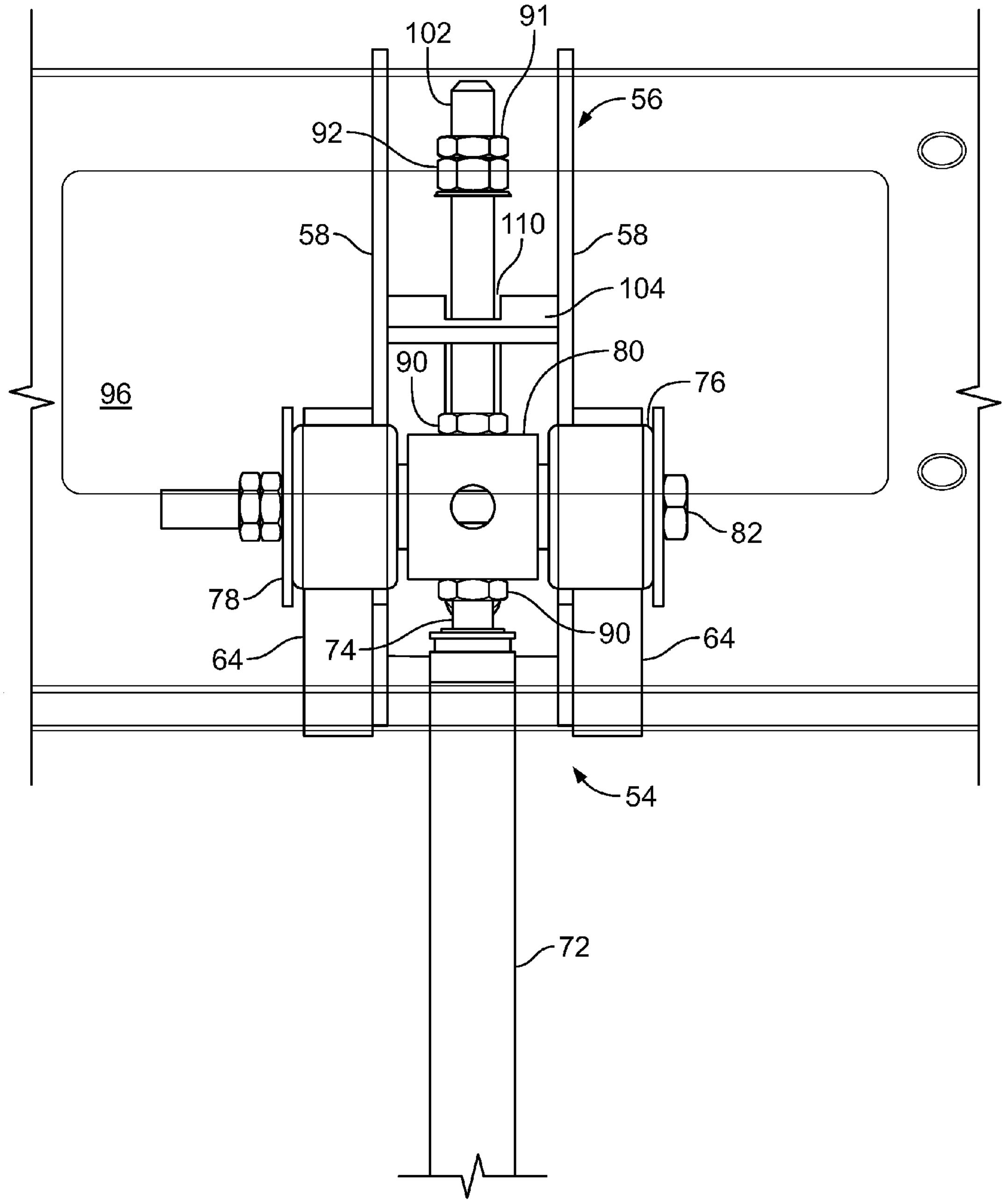
FIG. 9 is view of the hood position control taken along line 9-9 of FIG. 8.

As further shown in FIG. 6, surface 54 interacts with, i.e. is brought into abutting contact with first end 44, which includes a roller device 76. Surface 54 is associated with a track 56 that includes a plate portion 58 having apertures 60 which are configured to receive corresponding rods or pipes 62 to secure the track to hood 22, such as by welding, mechanical fasteners or other suitable device, material or technique. A material strip 64 is secured along an edge of plate portion 58, such as by welding, the material strip extending substantially perpendicular to plate portion 58 and including surface 54. In another embodiment, surface 54 may be directly formed or machined into hood 22. As shown in FIG. 9, track 56 includes a pair of tracks, each including a respective surface 54. That is, a pair of plate portions 58 are positioned parallel to each other, with corresponding material strips 64 extending in opposed directions, the material strips each including a corresponding surface 54 with which to interact with roller device 76. By virtue of the pair of tracks 56 and surfaces 54, with roller device 76 including corresponding rollers to interact with services 54, the arrangement is balanced, substantially reducing, if not eliminating, forces that are directed lateral to the direction of movement of the roller device along surfaces 54 while hood 22 is being raised or lowered.

FIG. 6 further shows positioned between plate portions 58 a slotted alignment plate 104 that include opposed tabs 108 which are received by corresponding slots 106 formed in the plate portions. Alignment plate 104 maintains the relative position and spacing of plate portions 58 with respect to each other. Although better shown in FIGS. 6, 8 and 9, slot 110 of alignment plate 104 is configured to permit a threaded rod 102 to move within slot 110, depending upon the amount the hood is opened or closed, due to the path traced during the rotational movement of the hood about its pivot 24 (FIG. 2). As further shown in FIG. 6, when the hood is in a closed position, nuts 91 and 92 may be moved along threaded rod 102 until brought into abutting contact with a surface of alignment plate 104 facing away from rod 72. Nuts 91, 92 may then be brought into contact with each other or jammed together to secure their relative position along threaded rod 102. Upon bringing nut 92, such as a flanged nut into abutting contact with the surface of alignment plate 104, the hood is urged downward and into contact with support structure of the frame of the work vehicle, thereby substantially preventing vibration or "rattling" of the hood when in closed position 52. It is to be noted that prior to nut 92 abutting the surface of alignment plate 104, roller device 76 is sufficiently retracted by actuator 42 so that the roller device 76 would no longer be in contact with surface 54 of material strip 64.

FIG. 7 shows roller device 76 with hood 22 in a closed position (hood 22 and track 56 not shown for reasons of clarity in FIG. 7) and FIG. 9 shows roller device 76 with hood 22 in an open position. Roller device 76 includes a pair of rollers 75 configured to receive a fastener 82, such as a bolt 84, washers 86 and nuts 88, such as jam nuts. Positioned beneath the head of fastener 82 and also adjacent to nuts 88 are guides 78 that maintain the rollers in lateral alignment with material strip 64 track 56 by laterally surrounding the material strip 64 of track 56 as shown in FIG. 9. Positioned between the pair of rollers 75 is a block 80 which is configured to receive bolt 84 and may be fixedly positioned along rod adapter 74 that is secured to the end of rod 72 by nuts 90, such as jam nuts. Further shown in FIG. 9, block 80 is positioned between the pair of plate portions 58 of the track.

As further shown in FIG. 7 (and FIG. 9), block 80 is also configured to receive rod adapter 74 and may be fixedly positioned along rod adapter 74 by nuts 90, such as jam nuts. In addition, nuts 92, such as jam nuts, may be positioned to an opposite portion of block 80 to receive a threaded rod 102 opposite rod adapter 74. In one embodiment, rod adapter 74 and threaded rod 102 may be parallel to each other. In yet another embodiment, rod adapter 74 and threaded rod 102 may be coaxial. As further shown in FIGS. 6, 8 and 9, adjustment of components such as nuts 91 and flange nuts 92 relating to vertical adjustment of the roller device 76 as previously discussed, as well as other components of the position control system may be achieved through an opening 96 that may be accessed upon the removal of fasteners 100 securing panel 98 to hood 22.

In operation, upon activation of driving device 48, first end 44 positioned along rod adapter 74 that extends from the end of rod 72 of actuator 42, and including roller device 76 is brought into interaction, i.e. abutting contact, with surface 54 of track 56. Upon further activation of driving device 48 in one direction, roller device 76 is brought into abutting contact with surface 54 and urges hood 22, which hood rotates about pivots 24 toward open position 50. Conversely, upon activation of driving device 48 in the other direction, roller device 76 is lowered, and by force of gravity, similarly supports and permits lowering of the hood 22 toward closed position 52. During operation of actuator 42, the actuator maintains a position that is substantially coincident with axis 46, which minimizes the amount of space required by the actuator, providing room for other components beneath the hood.

It is to be understood that in another embodiment of the position control system, more than one actuator may be utilized, with the actuator positioned in a non-centered position of the work vehicle. In yet another embodiment, the roller device may include opposed rollers that are positioned along both sides of the material strip of the track, such that two surfaces may be utilized, and that gravity would not be required to achieve a closed position of the hood or panel. That is, the driving device of the actuator could supply a retraction force that could be utilized to urge the hood or panel toward a closed position. It is also to be understood that in one embodiment, the position control system of the present disclosure may be utilized with a hood or panel that does not have a pivot or hinge joint, in which case the first end of the actuator would be directly secured to the hood or panel.

While the invention has been described with reference preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A position control system comprising:

an actuator having a first end, an axis and including a driving device for moving the first end of the actuator in opposed directions, the first end of the actuator configured to move a hood between an open position and a closed position;

a surface associated with the hood that is configured to interact with the first end of the actuator in response to the first end of the actuator contacting and moving the hood between the open position and the closed position;

wherein the first end of the actuator moves along the axis and remains substantially coincident with the first axis while the first end moves the hood between the open position and the closed position; and wherein the first end includes a roller device to interact with the track and the roller device includes a pair of guides laterally surrounding the track.

2. The system of claim 1, wherein the driving device is electrically powered.

3. The system of claim 1, wherein the hood surface includes a track.

4. A position control system comprising:

an actuator having a first end, an axis and including a driving device for moving the first end of the actuator in opposed directions, the first end of the actuator configured to move a hood between an open position and a closed position;

a surface associated with the hood that is configured to interact with the first end of the actuator in response to the first end of the actuator contacting and moving the hood between the open position and the closed position;

wherein the first end of the actuator moves along the axis and remains substantially coincident with the first axis while the first end moves the hood between the open position and the closed position;

the first end includes a roller device to interact with the track; and wherein the actuator includes a rod extending to a rod adapter having the first end, the rod adapter urged by the driving device to non-rotatably move along the actuator axis, the first end of the actuator rod adapter secured to the roller device.

5. The system of claim 4, wherein the actuator extends through an opening formed in a fixed structure to secure the actuator substantially coincident with the axis.

6. The system of claim 5, wherein at least a portion of the fixed structure opening includes a bulb seal.

7. A position control system comprising:

an actuator having a first end, an axis and including a driving device for moving the first end of the actuator in opposed directions, the first end of the actuator configured to move a hood between an open position and a closed position;

a surface associated with the hood that is configured to interact with the first end of the actuator in response to the first end of the actuator contacting and moving the hood between the open position and the closed position;

wherein the first end of the actuator moves along the axis and remains substantially coincident with the first axis while the first end moves the hood between the open position and the closed position;

the first end includes a roller device to interact with the track; and the roller device includes a pair of rollers.

8. The system of claim 7, wherein the track includes a separate track for each roller of the pair of rollers.

9. The system of claim 8, wherein the rod adapter is substantially centered between the pair of rollers.

10. The system of claim 9, wherein the track includes an alignment plate positioned between the separate tracks.

11. A work vehicle comprising:

a motor associated with selectable movement of a frame by operator controls;

the frame structurally carrying a cab structure;

a hood position control system secured to the frame of the work vehicle comprising:

an actuator having a first end, an axis and including a driving device for moving the first end of the actuator in opposed directions, the first end of the actuator configured to move a hood between an open position and a closed position;

a surface associated with the hood that is configured to interact with the first end of the actuator in response to the first end of the actuator contacting and moving the hood between the open position and the closed position; and wherein the first end of the actuator moves along the axis and remains substantially coincident with the first axis while the first end moves the hood between the open position and the closed position;

wherein the hood surface includes a track and the first end includes a roller device to interact with the track.

12. The work vehicle of claim 11, wherein the actuator is located within an engine compartment between structure defining an engine compartment and a cooling component.

13. The work vehicle of claim 11, wherein the roller device includes a pair of guides laterally surrounding the track.

14. The work vehicle of claim 11, wherein the actuator includes a rod extending to a rod adapter having the first end, the rod and rod adapter urged by the driving device to non-rotatably move along the actuator axis, the first end of the actuator rod adapter secured to the roller device.

15. The work vehicle of claim 14, wherein the actuator extends through an opening formed in a fixed structure to secure the actuator substantially coincident with the axis.

16. A work vehicle comprising:

a motor associated with selectable movement of a frame by operator controls;

the frame structurally carrying a cab structure;

a hood position control system secured to the frame of the work vehicle comprising:

an actuator having first end, an axis and including a driving device for moving the first end of the actuator in opposed directions, the first end of the actuator configured to move a hood between an open position and a closed position;

a surface associated with the hood that is configured to interact with the first end of the actuator in response to the first end of the actuator contacting and moving the hood between the open position and the closed position; and wherein the first end of the actuator moves along the axis and remains substantially coincident with the first axis while the first end moves the hood between the open position and the closed position; and an alignment plate having a surface opposite the hood surface associated with opening and dosing the hood, the alignment plate surface configured to interact with a nut and a threaded rod extending opposite from and substantially parallel to the rod adapter to substantially prevent vibration of the hood in a closed position.

* * * * *